(12) United States Patent
Corti et al.

(10) Patent No.: US 6,779,488 B2
(45) Date of Patent: Aug. 24, 2004

(54) FEED BOX FOR BREEDING POULTRY

(75) Inventors: Esterino Corti, Cuveglio (IT); Paolo Tancredi, Ome (IT)

(73) Assignee: Corti Zootecnici S.r.l., Monvalle (IT)

( * ) Notice: Subject to any disclaimer, the term of this patent is extended or adjusted under 35 U.S.C. 154(b) by 0 days.

(21) Appl. No.: 10/182,902

(22) PCT Filed: Jan. 31, 2001

(86) PCT No.: PCT/IT01/00046
§ 371 (c)(1),
(2), (4) Date: Oct. 18, 2002

(87) PCT Pub. No.: WO01/56374
PCT Pub. Date: Aug. 9, 2001

(65) Prior Publication Data
US 2003/0056730 A1 Mar. 27, 2003

(30) Foreign Application Priority Data

| Feb. 2, 2000 | (IT) | MI2000A0153 |
| Apr. 18, 2000 | (IT) | MI2000U0247 |
| Apr. 18, 2000 | (IT) | MI2000U0248 |
| Dec. 22, 2000 | (IT) | MI2000U0717 |

(51) Int. Cl.$^7$ .......................... A01K 5/02; A01K 39/012
(52) U.S. Cl. ......................... 119/57.4; 119/52.4
(58) Field of Search .................. 119/52.4, 57.4, 119/53, 51.01

(56) References Cited

U.S. PATENT DOCUMENTS

| 4,476,811 A | | 10/1984 | Swartzendruber |
| 5,097,797 A | * | 3/1992 | Van Zee et al. ............ 119/57.4 |
| 5,101,766 A | * | 4/1992 | Runion ........................ 119/53 |
| 5,275,131 A | | 1/1994 | Brake et al. |
| 5,406,907 A | * | 4/1995 | Hart ............................ 119/53 |
| 5,765,503 A | * | 6/1998 | van Daele ................. 119/52.4 |
| 5,778,821 A | * | 7/1998 | Horwood et al. ............. 119/53 |
| 5,794,562 A | | 8/1998 | Hart |
| 5,875,733 A | * | 3/1999 | Chen ......................... 119/57.4 |
| 5,884,581 A | * | 3/1999 | Vandaele ................... 119/52.4 |
| 6,050,220 A | * | 4/2000 | Kimmel et al. ............... 119/53 |

FOREIGN PATENT DOCUMENTS

EP 1275298 A2 * 1/2003 .......... A01K/39/01

* cited by examiner

Primary Examiner—Son T. Nguyen
(74) Attorney, Agent, or Firm—Nixon & Vanderhye P.C.

(57) ABSTRACT

A feedbox for breeding poultry includes at least one main protection grate mounted on a feed storage tub and with dividing plates and openings to allow the poultry access to the feed. The feedbox utilizes an auxiliary grate slidingly or rotationally joined to the main protection grate and equipped with a plurality of peripheral tips. The tips do not interfere with the openings of the main protection grate in at least a first relative position of the auxiliary grate with respect to the main grate and, vice versa, the tips at least partially obstruct one or more of the openings in at least a second relative position of the auxiliary grate with respect to the main grate.

27 Claims, 6 Drawing Sheets

FEED BOX FOR BREEDING POULTRY

This application is the US national phase of international application PCT/GB01/00046 filed 31 Jan. 2001, which designed the US.

FIELD OF THE INVENTION

The present invention concerns a feedbox to supply feed to poultry breeding in general.

BACKGROUND ART

In general, feedboxes are connected to a main feeding tube within which the feed is continuously supplied by an auger screw. At each point where a feedbox is to be set, the main tubular duct comprises a discharge port which opens downwards. The lower part of each feedbox comprises a feed storage tub, which must be accessible to the animals regardless of their size through the whole of their growth stage.

For this reason, feedboxes are therefore equipped with means to adjust the amount of feed that is kept in the storage tub. This is necessary to adapt the amount of feed made available according to the growth stage of the animals present in a particular installation. However, in contrast to this main requirement is the need to avoid feed waste as much as possible, a factor that can considerably influence the costs connected with large scale breeding. The feedboxes of the known type do not generally envisage adjustment systems of the feed level able to effectively prevent feed waste. In fact, such feedboxes have fixed mesh feed protection grates that often do not prevent the chicks, especially when very young, from completely entering the feedbox and unnecessarily dispersing the feed and soiling it with excrement and dirt. Therefore, use of these feedboxes, during the growth of poultry, requires variation in the configuration of the protection grate depending on the size reached by the poultry. When the poultry is at the chick stage, a protection cage with particularly reduced openings will be needed, whereas larger openings will be used for adult poultry.

However, it would be expedient that such feedboxes, for economic reasons, entirely accompany the life cycle of poultry from the chick stage to that of adults. For this purpose, it therefore becomes necessary to use a feedbox with a protection grate in which accessibility to the feed can be regulated depending on the size of the poultry.

In addition, the known type of feedboxes have feed adjustment systems which are complex and difficult to use, above all because the locking into position of the shutter that regulates feed flow requires manual handling of the shutter, which is typically found inside the feedbox.

Moreover, it is expedient to underline that as soon as the chicks are put into breeding sheds they tend to occupy only certain areas of the available space and take feed from a only few feedboxes. Only with time and an increase in poultry size, by now almost adults, will they move around all the shed space making use of all the feedboxes present therein. In order to provide for effective plant management that avoids feed waste it is necessary to be able to supply the individual feedboxes separately according to the behavioural factors and/or factors connected to the growth of the poultry.

DISCLOSURE OF THE INVENTION

The task of the present invention is to propose a feedbox to supply feed to breeding poultry which can be used effectively throughout the life cycle of the poultry and that solves the drawbacks of the known technique.

Within the scope of this task, an object of the present invention is to produce a feedbox for poultry that is easy to manufacture and effectively prevents the entry of chicks inside the feed container.

An object of the present invention is to propose a feedbox of the type specified above that allows a simple and precise adjustment of the feed level in the storage tub of the same feedbox.

Another object of the present invention is to propose a feedbox that eliminates feed waste.

Another object of the present invention is to propose a feedbox that allows individual adjustment of the feeding tubes in a simple and precise way.

Furthermore, a feedbox that can be produced with particularly contained costs, which can be particularly simple to use and easy to remove if and when necessary.

These objects are achieved by the present invention, that concerns a feedbox to feed breeding poultry, of the type connected to a main feed auger screw and comprising: at least one gravity feeding tube joined to the main feed auger screw by means of a pipe fitting device, the feeding tube having one or more ports for the passage of feed; at least one storage tub for the feed coming from the feeding tube; means to adjust the feed level; at least one main protection grate mounted on the storage tub and provided with dividing plates and openings to allow the poultry access to the feed. The feedbox also includes at least one sliding auxiliary grate or rotationally joined to the main protection grate, the auxiliary grate comprising a plurality of peripheral tips and arranged so that the tips do not interfere with the openings of the main protection grate in at least one initial relative position of the auxiliary grate with respect to the main grate and, vice versa, obstruct at least partially one or more of the openings in at least one second relative position of the auxiliary grate with respect to the main grate.

This allows the accomplishment of a feedbox for breeding poultry able to be effectively used throughout the life cycle of the poultry since it prevents, in an optimum way, the possible entry of both chicks and adults inside the same feedbox.

According to a particular aspect of the present invention, the auxiliary grate is rotationally mounted above the storage tub, and in particular on the main grate, and the tips partially extend towards the storage tub.

According to another aspect of the present invention, the number of tips of the auxiliary grate is the same as the dividing plates of the main protection grate and the dividing plates are angularly equidistant from each other, as well as the tips of the auxiliary grate are angularly equidistant.

According to a preferred aspect of the present invention, the means for adjusting the feed level comprise at least one adjustment assembly to continuously vary the distance between the free edge of the main protection grate and the upper edge of the tub.

This allows the free edge of the main grate to be always kept at the most suitable height to avoid the feed overflowing from the feedbox, and prevent the poultry dispersing the feed unnecessarily.

According to a preferred aspect of the present invention, the adjustment assembly comprises one or more slots and one or more corresponding pins engaged in the slots to vary the distance between the free edge of the main protection grate and the upper edge of the storage tub.

According to a preferred aspect of the present invention, the slots have a profile comprising a plurality of appropriately distanced seats able to engage the pins to prevent the undesired rotation of the main protection grate with respect to the tub.

According to a preferred aspect of the present invention, the means to adjust the feed level comprise at least one shutter sliding on the gravity feeding tube to intercept the feed passage ports and friction means to hold the shutter in position.

According to an advantageous aspect of the present invention, the shutter is connected to at least one wire on which the friction means act.

The provision of friction means to hold the shutter in position considerably simplifies the manual handling of the shutter itself to accurately set the desired feed level in the storage tub.

According to a preferred aspect of the present invention, the pipe fitting device comprises a member to adjust the feed flow to the gravity feeding tube of the feedbox.

According to another preferred aspect, the member to adjust the feed flow comprises a shutter sliding in a guide along at least one portion of the side surface of the pipe fitting device and means to adjust the position of this shutter with respect to the gravity feeding tube.

A sliding shutter in a guide along the side surface of the pipe fitting device, produced in this way, allows the individual adjustment of the feeding tubes in a simple and precise way.

BRIEF DESCRIPTION OF THE DRAWINGS

Additional features and advantages of the present invention will become clearer from the description which follows, made simply as an explanatory, non-limiting example, with reference to the enclosed drawings, in which.

MODES FOR CARRYING OUT THE INVENTION

Figure 4:
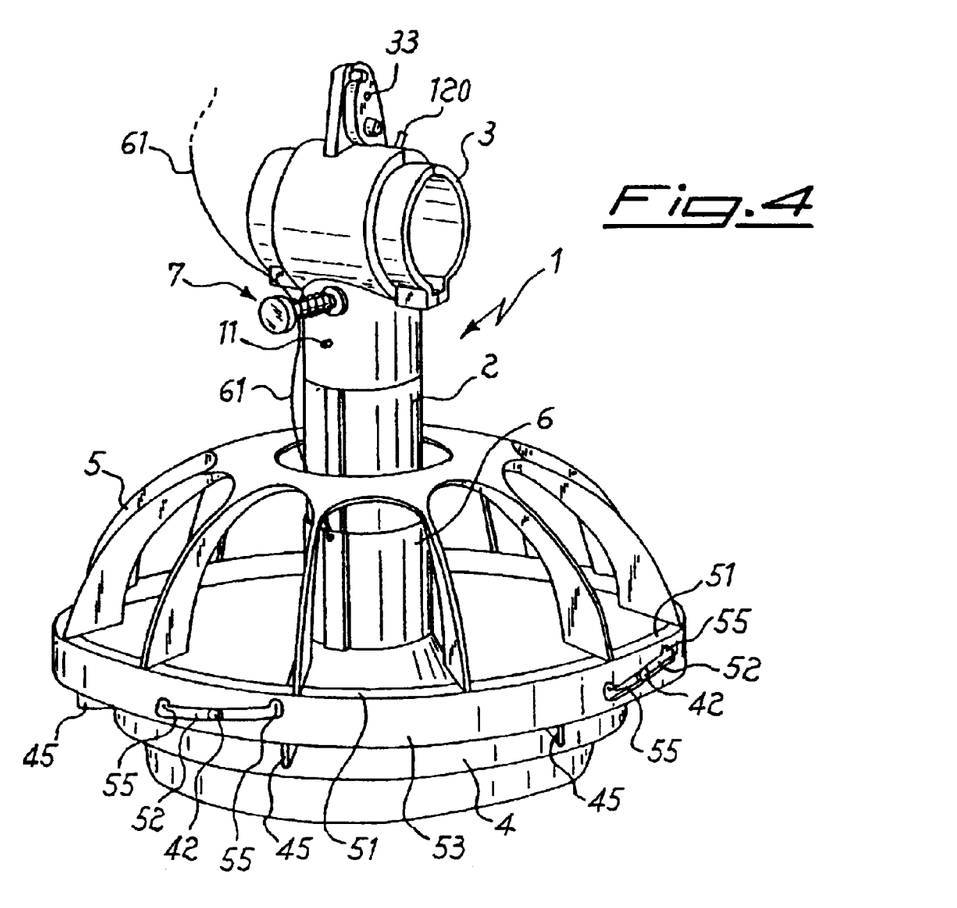
FIG. 4 is an elevation view of a feedbox according to an embodiment of the present invention.

The feedbox 1 comprises, see FIG. 4, a gravity feeding tube 2 connected to a main feed auger screw (not shown) by means of a pipe fitting device 3. The feeding tube 2 has a pair of ports 21 (FIG. 5) that allow the passage of feed from the feeding tube 2 to a storage tub 4.

A main protection grate 5 is located above the storage tub 4 designed to prevent the poultry from gaining access to the interior of the storage tub. The main protection grate 5 is mounted on the storage tub 4 and has a free edge 51 that overlaps the upper edge 41 (FIGS. 6A and 6B) of the tub 4.

In particular, the main protection grate 5 surrounds the feeding tube 2 and consists of mutually alternated dividing plates 85 and openings 86. The openings 86, defined by the dividing plates 85, are only large enough to allow an adult bird to insert its head within the feedbox to reach the feed in the storage tub 4.

Figure 3:
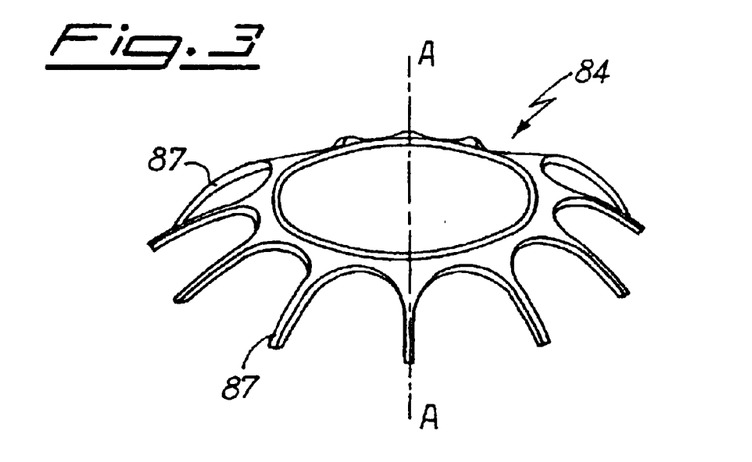
FIG. 3 is a perspective view of an auxiliary grate according to the present invention.

The feedbox also has an auxiliary grate 84 (FIG. 3) rotationally connected to the same main grate 5 and with mutually equidistant tips 87. The auxiliary grate 84 is shaped in a such way that the tips 87 can be completely superimposed by the dividing plates 85 of the main grate 5, in an initial relative position between main grate 5 and auxiliary grate 84, and they can partially obstruct the openings 86 of the main grate 5, in a second relative position between main grate 5 and auxiliary grate 84 (shown in FIG. 1).

Figure 1:
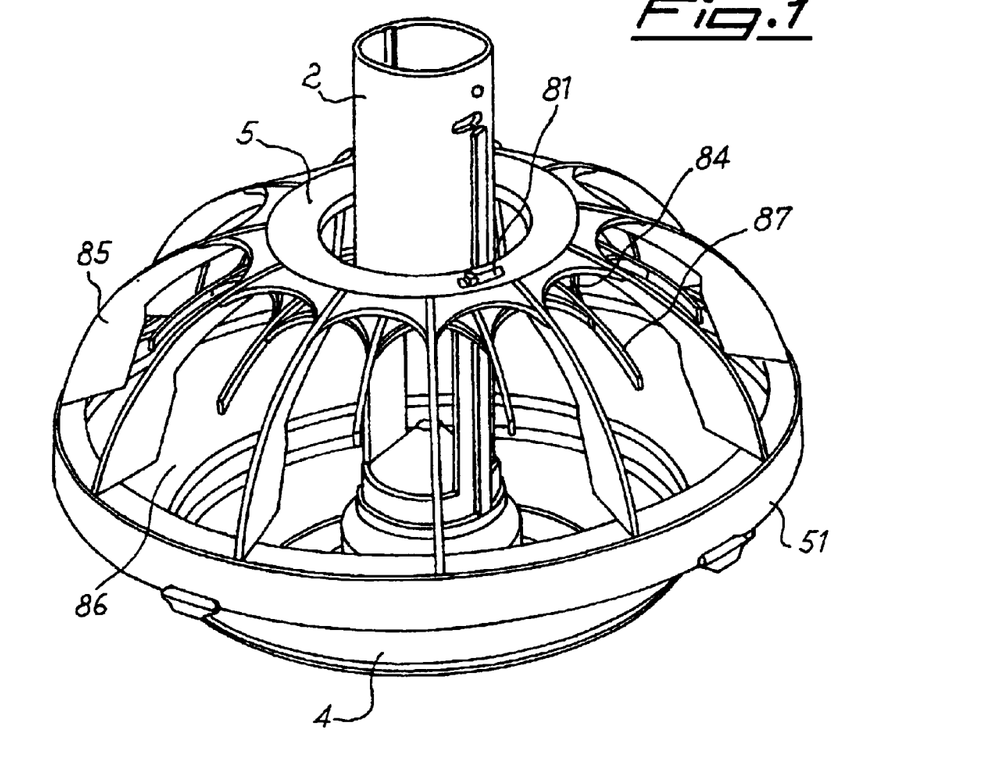
FIG. 1 is a partial perspective view of the feedbox, according to the invention, in which the tips of the auxiliary grate partially obstruct the openings of the main grate.

In the embodiment shown in FIG. 1, the auxiliary grate 84 is located at the upper portion of the main grate 5, around the feeding tube 2, and the tips 87 partially extend towards the upper edge 1 of the tub 4, so as to reduce the height of the feed access openings 86, when the tips 87 are set at the latter.

Thus, when the poultry are at the beginning of their growth, i.e. at the chick stage, it is necessary to rotate the auxiliary grate 84 with respect to the main grate 5, or vice versa, the main grate 5 with respect to the auxiliary grate 84, to make the feed access openings 86 partially obstructed by the tips 87, in a such way to prohibit chicks access inside the same feedbox. On the contrary, when the poultry are adults, it is sufficient to rotate the auxiliary grate 84 again, or the main grate 5, so as to set the tips 87 at the dividing plates 85 and therefore free the access openings 86 to allow the poultry to feed.

The form and arrangement of the tips 87 are designed so that the end of the latter is set from the edge 1 of storage tub 4 at a lesser distance than average chick height and, in particular, at a distance of between 3.5 and 4 cm, to discourage the chicks from jumping on the edge 51 of the storage tub and entering inside the feedbox. There is an equal number of dividing plates 85 and tips 87 and both the tips 87 and the dividing plates 85 are mutually equidistant.

Besides, it is preferable to set the auxiliary grate 84 internally with respect to the main grate 5, thus preventing the tips, especially when superimposed by the dividing plates 85 and thus harder to distinguish from the latter, from sticking out dangerously for the poultry.

Figure 2:
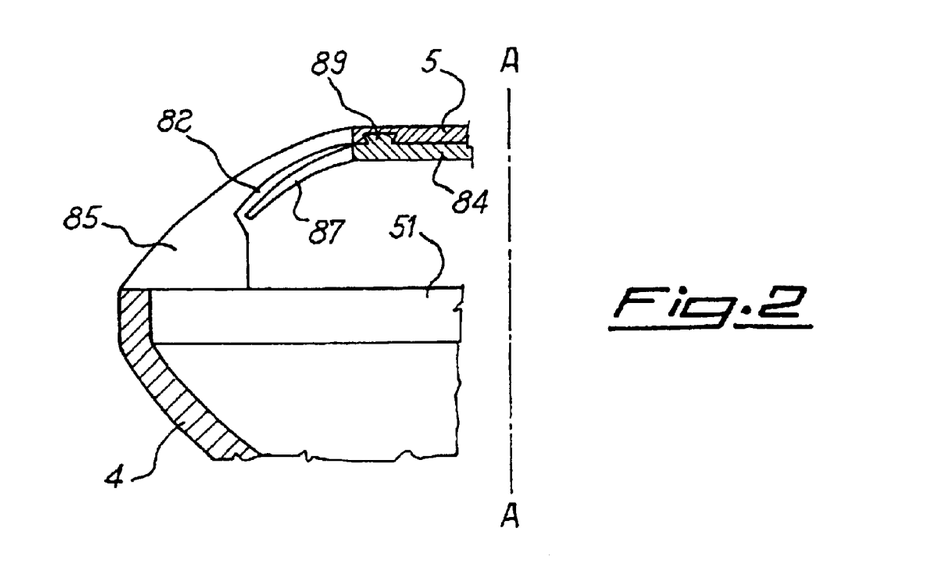
FIG. 2 is a cutaway side view of the feedbox, according to the invention, at the connection between the main grate and auxiliary grate.

Moreover, to aid the relative rotation between main grate 5 and auxiliary grate 84, when the latter is internally mounted with respect to the main grate 5, the dividing plates 85 of the same main grate 5 have a slot 82 inside (FIG. 2) within which are arranged the tips 87 of the grate 84 without any mutual interference.

In particular, the main grate 5 has a groove on the inner surface of its upper closing portion that joins with a shaped projection of the auxiliary grate 84 in a sliding connection 89 along the entire perimeter of the same main grate 5 to allow the rotation of the auxiliary grate 84 with respect to the main grate 5, that is instead fixed to the storage tub 4. Thus the connection 89 only allows the sliding of the projection of the auxiliary grate 84 along the circular way defined by the groove made on the main grate 5, preventing any other relative movement between main grate 5 and auxiliary grate 84.

According to the present invention, in feedboxes where there is a rotating connection between main grate 5 and auxiliary grate 84, an external control system 81 (FIG. 1) can also be provided, as shown in FIG. 1, for the rotation of the auxiliary grate 84 with respect to the main grate 5, consisting of a slot made on the main grate 5 and a pin integral with the auxiliary grate 84 sliding inside the slot to allow rotation of the auxiliary grate 84 with respect to the main fixed grate. FIG. 4 and the detailed views of FIGS. 9A and 9B instead show the assembly that allows the continuous variation of the distance between the free edge 51 of the main protection grate 5 and the upper edge of the tub 4.

Figure 9A:
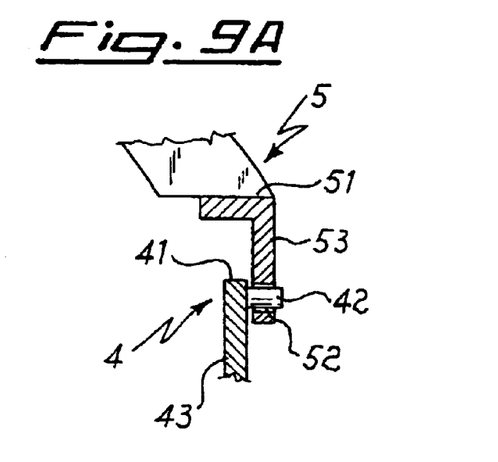
FIGS. 9A and 9B are cutaway views of a detail of the feedbox in FIG. 4.
Figure 9B:
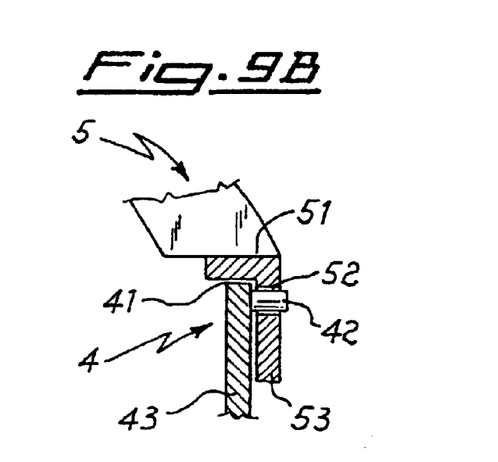

According to the invention, this adjustment assembly comprises one or more slots 52 made in a side band 53 of the main grate 5 that surround the side wall 43 of the tub 4. From the side wall 43 of tub 4, at each inclined slot 52, pins 42 protrude which fit into in the respective slots 52. The variation of the distance between the free edge 51 of the main grate 5 and the upper edge 41 of the tub 4 can be easily carried out by manually turning the main grate 5 with respect to the tub 4.

Tabs 45 (FIG. 4), protruding under tub 4, are preferably provided to help the mutual rotation between the main grate 5 and the tub 4. In the position shown in FIG. 9A, the distance between the free edge 51 of the main grate 5 and the upper edge 41 of the tub 4 is maximum, i.e. a suitable position to allow the feeding of adult poultry. In the position shown in FIG. 9B, the two edges 41 and 51 are instead in such a position to allow smaller poultry to reach the feed present on the edge 51 without feed being wasted.

According to an advantageous aspect of the present invention, the slots 52 have a plurality of appropriately equidistant seats 55 able to engage the pins 42 to determine a series of discrete adjustment positions and simultaneously prevent any undesired rotation of the protection grate 5 with respect to the tub 4.

Some slot embodiments according to the invention are shown in FIGS. 10A–10F. The embodiments shown in FIGS. 10A–10D have slots with a substantially inclined tendency, the embodiment in FIG. 10E has a form with only some inclined sections, while the embodiment in FIG. 10F has a substantially straight progression with vertical slots that terminate at different heights in correspondence of different seats 55. For adjustment of the feed level, feedbox 1 also has a shutter 6 sliding on the feeding tube 2 to intercept the feed passage ports so as to allow the adjustment of the feed volume inside the tub A. To aid the sliding of the shutter 6 on the feeding tube 2 without the chance of rotation of one part with respect to the other, there are some hollow guide surfaces 63 (FIG. 5) that engage in corresponding protruding ribs 23 on the feeding tube 2. The protruding ribs 23 give the duct 2 extra rigidity at the portion comprising the ports 21.

The shutter 6 is fastened to a wire 61 on which friction means 7 preferably act to hold it in position once the desired adjustment has been carried out. The wire 61 is thus used to carry out the manual adjustment of the height of shutter 6. The free wire end 61 can be fixed for convenience to any hooking part (not shown), if necessary, on the feedbox 1 or on the main feed auger screw.

Figure 5:
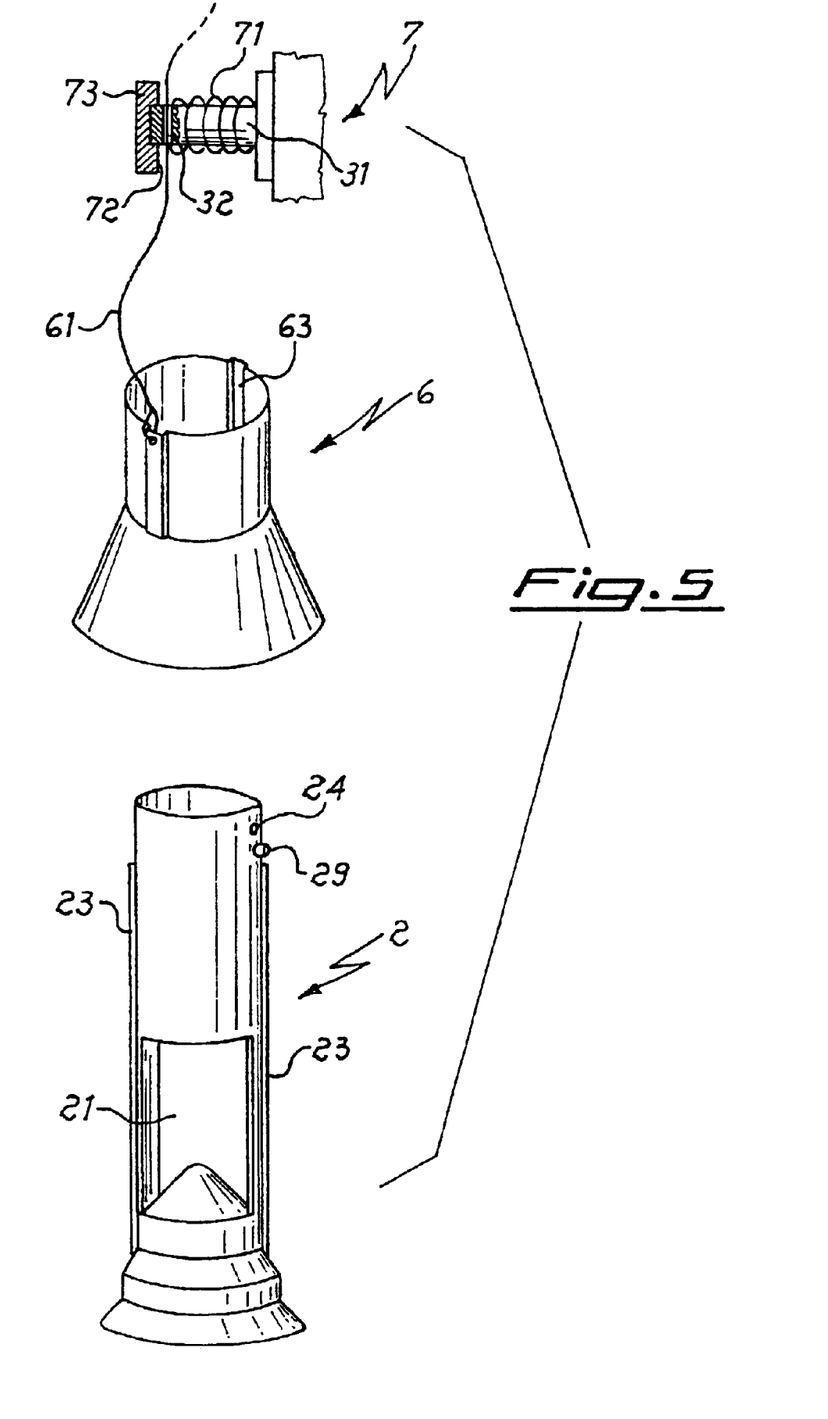
FIG. 5 is a view of some parts of the feedbox shown in FIG. 4.
Figure 6:
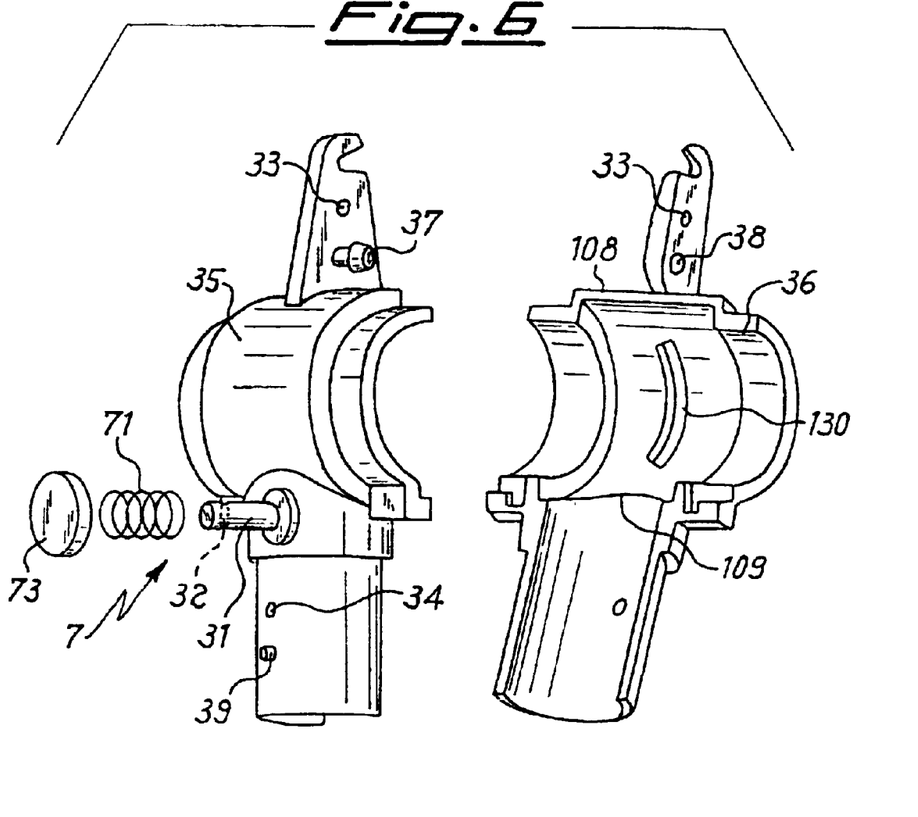
FIG. 6 is a view of a pipe fitting device, with separated members, for a feedbox according to the present invention.
Figure 7:
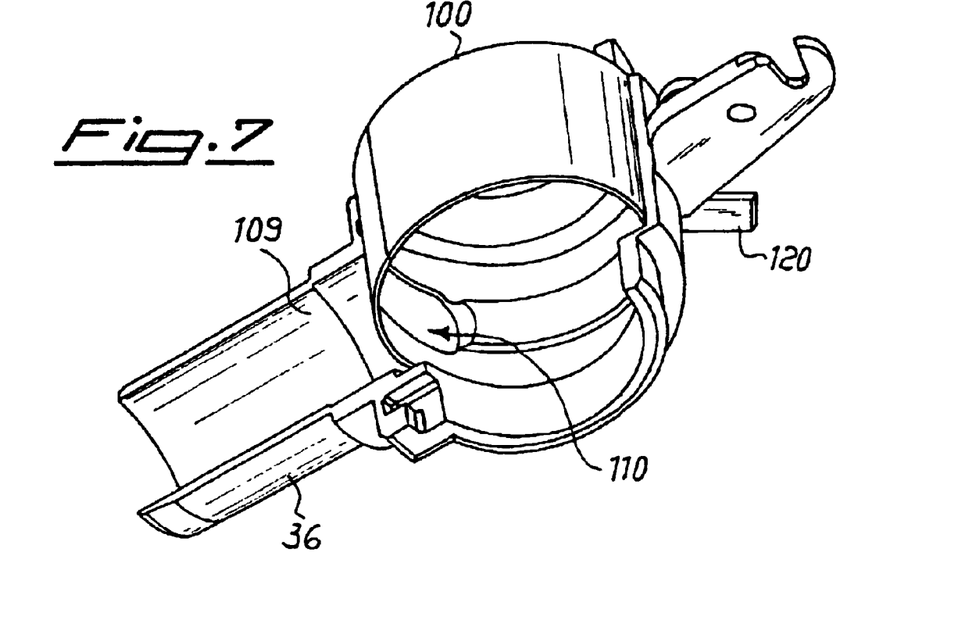
FIG. 7 is a perspective view of a half-shell of the pipe fitting device in FIG. 6 with the shutter inserted in a relevant guide.

As better shown in FIGS. 5 and 6, the friction means 7 comprise an elastic member, namely a helical spring 71 that pushes the wire 61 against a friction surface 72 supplied with a button 73. The helical spring 71 is mounted on a pin 31 which sticks out from the pipe fitting device 3, with the button 73 fixed to the free end of the pin 31 in a known way, for instance by heat sealing, friction welding, glueing, fixed joint, threading or similar. Alternatively, the button 73 can also be produced in a single piece with the pin 31.

Near the button 73, the pin 31 has a transversal hole 32 crossed by the wire 61, so that the spring 71 pushes the wire 61 against the friction surface 72 offered by button 73.

As can be seen in FIG. 6, the pipe fitting device 3 that connects the main feed auger screw and the feeding tube 2 is a three-way pipe fitting device consisting of a pair of distinct half-shells 35 and 36 separated according to a vertical plane and hinged together, and that creates a hole 109 for the passage of the feed into said gravity feeding tube 2. To adjust the feed supply to the feeding tube 2, a shutter 106 is envisaged that slides in a guide 108 on the side surface of the pipe fitting device.

Figure 8:
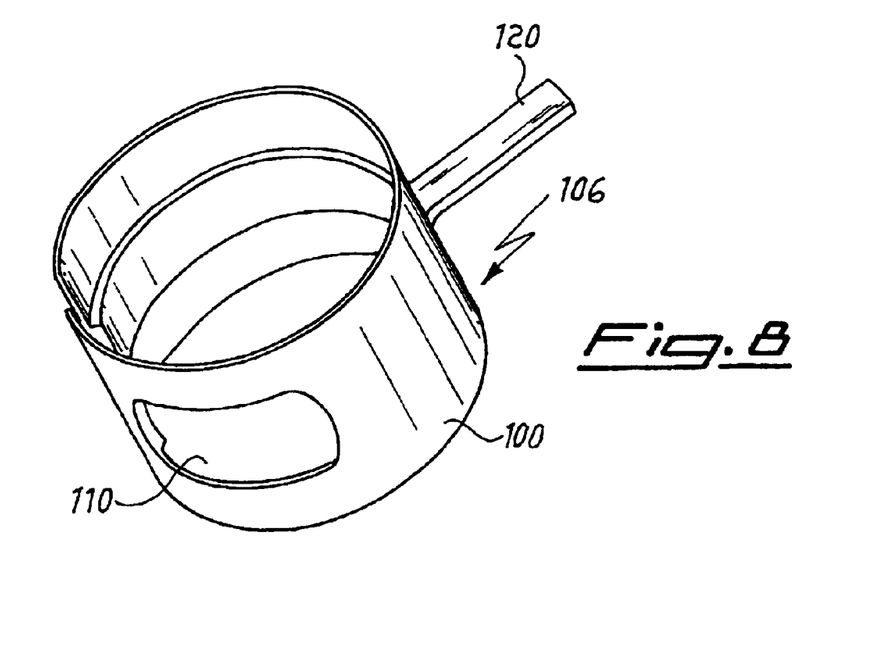
FIG. 8 is an enlarged view of the shutter in FIG. 7.

The shutter 106, sliding within the guide 108 made on an internal side surface of the pipe fitting device, opens or closes the hole 109 of the feeding tube 2 to allow, according to feedbox operation needs, the passage of the feed from the main auger screw to the feeding tube 2. In a preferred embodiment, shown in FIG. 8, the shutter 106 is a curved plate able to form a cylindrical part 100 with a slit 110 of appropriate size on its side surface that allows, when placed over the hole 109 of the feeding tube, the passage of the feed to the feeding tube 2.

In addition, the shutter 106 has means to adjust its position inside the guide with respect to the hole 109 of the feeding tube 2. In particular, such adjustment means consist of a tab 120 integral with the cylindrical part 100 and protruding from its side surface to engage, in a sliding way, a slot 130 that crosses the guide 108 on the side surface of the pipe fitting device 3.

Moving the tab 120 inside slot 130 of the pipe fitting device 3 varies the position of the slit 110 of the cylindrical part 100 with respect to the port of feeding tube 2, thus making the passage of the feed possible inside the feeding tube 2 or its total or partial interception.

According to a preferred aspect of the invention, the cylindrical part 100 forming the shutter is a flexible curved sheet that forms a closable and/or openable ring-shaped band. This latter feature of the cylindrical part assists its removal from the pipe fitting device 3 should it prove necessary to replace it in case of damage or when it is necessary to clean inside the device 3.

Besides, to avoid the mutual overlapping of the end of the ring-shaped band, during shutter movement inside the relevant guide 108, locking means are preferably present i.e. two protruding parts i.e. projections (not shown) that lock such ends by contrast. Turning again to FIGS. 4 and 6, the pipe fitting device 3 that joins the main feed auger screw and the feeding tube 2 is a three-way pipe fitting device consisting of a pair of separate half-shells 35 and 36 separated according to a vertical plane and hinged together. In fact, half-shell 35 comprises a hinge pin 37 able to be snap inserted into a corresponding hole 38 on the half-shell 36.

In the embodiment described herein, the pin 31 of the friction means 7 is shown integral with the half-shell 35 for reasons of clarity, but is appropriate to emphasize that the same pin 31 is preferably made integral with the half-shell 36, so as to simplify the shape of the two half-shells.

The pipe fitting device 3 thus formed allows to assist assembly operations and removal of the feedbox 1 with respect to the feed auger screw.

The connection between the pipe fitting device 3 and the feeding tube can, for instance, be formed by means of a bayonet joint using a protruding pin 39 that engages a groove 29 (FIG. 5) of shape and size suitable to produce this type of joint. A possible locking pin 11 (FIG. 4) can be inserted in the through hole 34 of pipe fitting device 3 (FIG. 6) and in the through hole 24 (FIG. 5) of the feeding tube 2 to prevent the undesired release of the feedbox 1 from the pipe fitting device 3.

When one wishes to remove the feedbox 1 from the pipe fitting device 3, the locking pin 11 can be taken off and put in a hole 33, made in corresponding positions on both the half-shells 35 and 36, so as to prevent the undesired opening of the half-shells hinged together when the feeding tube 2 is removed from the pipe fitting device 3.

FIGS. 10A–10F show some of the possible embodiments of the height adjustment means of the free edge. Moreover, it is expedient to underline that, alternatively with respect to the embodiment shown in FIG. 4, the slots 52 can also be made in the tub 4, with the pins 42 protruding inwards from the protection grate 5.

Figure 10A:
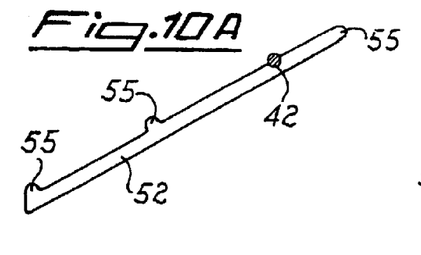
FIGS. 10A–10F are outline views that show possible embodiments for the adjustment means of the grate edge.
Figure 10B:
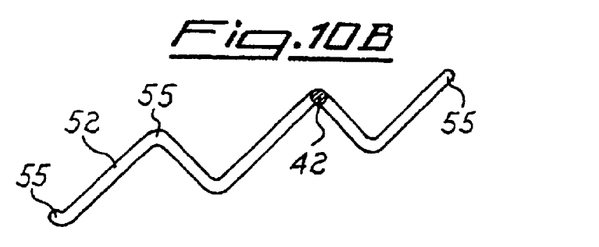
Figure 10C:
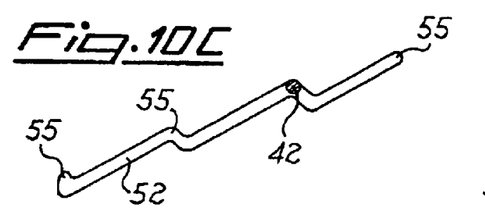
Figure 10D:
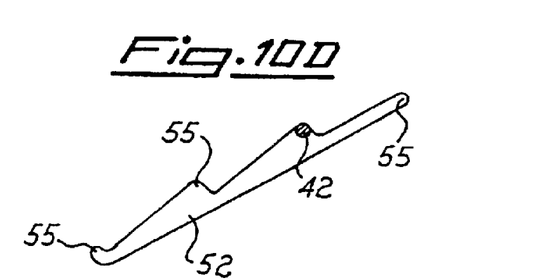
Figure 10E:
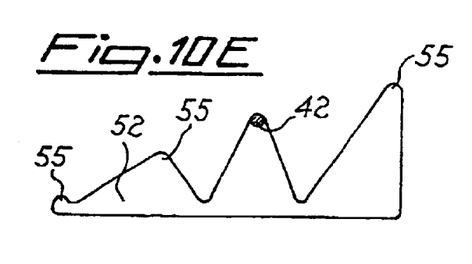
Figures 10F, 11B:
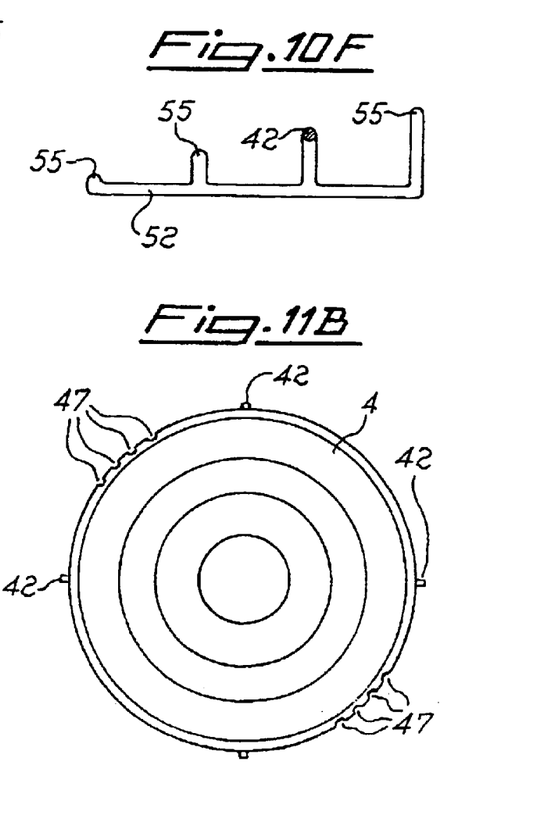
FIGS. 11A and 11B are outline plan views, from the lower part of a grate and from the top of a tub respectively, of the feedbox according to the invention.
Figure 11A:
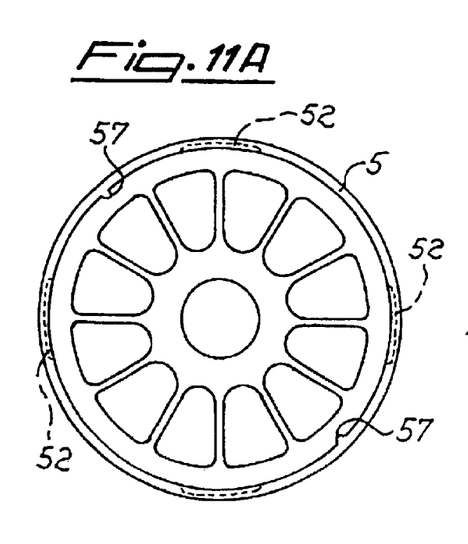

FIGS. 11A and 11B show an embodiment example of the auxiliary means that produce a releasable snap locking of the main grate 5 with respect to the tub 4. The main grate 5 (plan view from below in FIG. 11A) comprises at least a protruding portion 57 designed to engage in a plurality of recesses 47 on the tub 4 (plan view from above FIG. 11B).

The embodiment shown in FIGS. 11A and 11B have a pair of portions 57 that stick out towards the inside of the side band 53 of the main grate 5 in diametrically opposite positions, and two corresponding series of recesses located on the side wall 43 of the tub 4.

However, it is appropriate to point out that the figures only represent an embodiment example, but the reverse arrangement can also be adopted, i.e. with the recesses 47 made on the grate 5 and the protruding portions 57 made on the tub 4, as can also be varied the plurality of recesses and projections without leading away from the scope of the present invention.

What is claimed is:

1. A feedbox to supply feed to breeding poultry, of the type connected to a main feed auger screw and comprising:
   at least one gravity feeding tube connected to said main feed auger screw by means of a pipe fitting device, said feeding tube having one or more feed passage ports;
   at least one storage tub for the feed coming from said feeding tube;
   means to adjust the feed level;
   at least one main protection grate mounted on said storage tub and provided with dividing plates and openings to allow the poultry access to the feed, a free edge of said main grate overlapping an upper edge of said tub; and
   at least one auxiliary grate slidingly or rotationally joined to the main protection grate, said auxiliary grate comprising a plurality of peripheral tips and arranged so that the tips do not interfere with the openings of the main protection grate in at least one first relative position of the auxiliary grate with respect to the main grate and, vice versa, so that the tips obstruct at least partially one or more of said openings in at least one second relative position of the auxiliary grate with respect to the main grate, the tips in the second relative position of the auxiliary grate reducing a height of said openings.

2. A feedbox according to claim 1, wherein said auxiliary grate is rotationally mounted with respect to said main grate.

3. A feedbox according to claim 1, wherein said auxiliary grate is mounted above the feed storage tub and internally with respect to said main grate, and wherein the tips partially extend towards said feed storage tub.

4. A feedbox according to claim 3, wherein the dividing plates of said main grate have internal seats for removably housing the tips of said auxiliary grate.

5. A feedbox according to claim 1, wherein said plurality of tips has a number of tips equal to the number of dividing plates of said main grate.

6. A feedbox according to claim 5, wherein said dividing plates are angularly equidistant from each other, and wherein the tips are also angularly equidistant from each other.

7. A feedbox according to claim 1, wherein said means to adjust the feed level comprises at least one adjustment assembly to continuously vary the distance between the free edge of said main protection grate and the upper edge of said tub.

8. A feedbox according to claim 7, wherein said adjustment assembly comprises one or more slots and one or more corresponding pins engaged in said slots to vary the distance between the free edge of said main protection grate and the upper edge of said tub.

9. A feedbox according to claim 8, wherein said slots have a profile comprising a plurality of appropriately distanced seats able to receive said pins to prevent undesired rotation of said main protection grate with respect to said tub.

10. A feedbox according to claim 8, wherein said slots are located in a side band of said main grate, said side band being located below the free edge of said main grate and surrounding a side wall of said tub on which said pins are fixed.

11. A feedbox according to claim 8, wherein said slots are located on a side wall of said tub and said pins are fixed on a side band of said main grate, said side band being located below the free edge of said main grate and surrounding the side wall of said tub.

12. A feedbox according to claim 7, wherein said means to adjust the feed level further comprises auxiliary means to form a releasable type snap locking.

13. A feedbox according to claim 12, wherein said auxiliary snap locking means comprises at least one protruding portion on a side band of said main grate and able to engage a plurality of recesses on said tub.

14. A feedbox according to claim 12, wherein said auxiliary snap locking means comprises at least one protruding portion present on said tub and able to engage a plurality of recesses on said main grate.

15. A feedbox according to claim 1, wherein said means to adjust the feed level comprises at least one shutter sliding on said feeding tube to intercept said feed passage ports and friction means to hold said shutter in position.

16. A feedbox according to claim 15, wherein said shutter is connected to at least one wire on which said friction means act.

17. A feedbox according to claim 16, wherein said friction means comprises at least one elastic member able to push said wire against a friction surface.

18. A feedbox according to claim 1, wherein said pipe fitting device to join the main feed auger screw to said feeding tube of the feedbox is a three-way pipe fitting device including a pair of distinct half-shells separated according to a vertical plane and hinged together.

19. A feedbox according to claim 18, wherein said pipe fitting device comprises a member to adjust the feed flow to the feeding tube of the feedbox.

20. A feedbox according to claim 19, wherein said member to adjust the feed flow comprises a shutter sliding in a guide along at least one portion of a side surface of said pipe fitting device and means to adjust the position of said shutter with respect to the gravity feeding tube.

21. A feedbox according to claim 20, wherein said shutter slides in a guide made along an internal side surface of said pipe fitting device.

22. A feedbox according to claim 20, wherein said shutter is a tubular part with a slit for passage of the feed.

23. A feedbox according to claim 20, wherein said means to adjust the shutter position with respect to the feeding tube of the feedbox comprises a tab integral with the shutter, engaged in a sliding way within a slot formed on the side surface of said pipe fitting device.

24. A feedbox according to claim 18, wherein said half-shells comprise mutual connection portions, a first of said connection portions on a first of said half-shells comprising a hinge pin integral with it designed to be introduced into a corresponding hinge hole on a second of said connection portions of the second of said half-shells.

25. A feedbox to supply feed to breeding poultry, of the type connected to a main feed auger screw and comprising:
- at least one gravity feeding tube connected to said main feed auger screw by means of a pipe fitting device, said feeding tube having one or more feed passage ports;
- at least one storage tub for the feed coming from said feeding tube;
- means to adjust the feed level;
- at least one main protection grate mounted on said storage tub and provided with dividing plates and openings to allow the poultry access to the feed, a free edge of said main grate overlapping an upper edge of said tub; and
- at least one auxiliary grate slidingly or rotationally joined to the main protection grate, said auxiliary grate comprising a plurality of peripheral tips and arranged so that the tips do not interfere with the openings of the main protection grate in at least one first relative position of the auxiliary grate with respect to the main grate and, vice versa, so that the tips obstruct at least partially one or more of said openings in at least one second relative position of the auxiliary agate with respect to the main grate,
- wherein said tips partially obstruct all the openings of said grate extending in a such way that each free end of the tips is set at a height between 3 and 5 cm with respect to the upper edge of the feedbox.

26. A feedbox for supplying reed to breeding poultry via a main feed auger screw through a gravity feeding tube, the feedbox comprising:
- at least one storage tub that stores feed fed via the feeding tube;
- at least one main protection grate mounted on said storage tub and provided with dividing plates and openings to allow the poultry access to the feed, a free edge of said main grate overlapping an upper edge of said tub;
- at least one auxiliary grate slidingly or rotationally joined to said main protection grate, said auxiliary grate comprising a plurality of peripheral tips and arranged so that the tips do not interfere with the openings of the main protection grate in at least one first relative position of the auxiliary grate relative to the main grate and, vice versa, so that the tips obstruct at least partially one or more of said openings in at least one second relative position of the auxiliary grate with respect to the main grate, the tips in the second relative position of the auxiliary grate reducing a height of said openings; and
- an adjustment assembly effected between said storage tub and said protection grate, the adjustment assembly adjusting a feed level.

27. A feedbox for supplying feed to breeding poultry via a main feed auger screw through a gravity feeding tube, the feedbox comprising:
- at least one storage tub that stores feed fed via the feeding tube;
- at least one main protection grate mounted on said storage tub and provided with dividing plates and openings to allow the poultry access to the feed, a free edge of said main grate overlapping an upper edge of said tub;
- at least one auxiliary grate slidingly or rotationally joined to said main protection grate, said auxiliary grate comprising a plurality of peripheral tips and arranged so that the tips do not interfere with the openings of the main protection grate in at least one first relative position of the auxiliary grate relative to the main grate and, vice versa, so that the tips obstruct at least partially one or more of said openings in at least one second relative position of the auxiliary grate with respect to the main grate, the tips in the second relative position of the auxiliary grate reducing a height of said openings; and
- an adjustment assembly effected between said storage tub and said main protection grate, the adjustment assembly adjusting a height position of said main grate relative to said storage tub.

* * * * *